May 30, 1967  J. C. KENNEDY ET AL  3,322,890
BUSHING-SEAL

Filed March 31, 1966  2 Sheets-Sheet 1

INVENTORS
JOHN C. KENNEDY
GIRARD S. HAVILAND
BY
Stephen J. Rudy
ATTORNEY

May 30, 1967  J. C. KENNEDY ET AL  3,322,890
BUSHING-SEAL

Filed March 31, 1966  2 Sheets-Sheet 2

INVENTORS
JOHN C. KENNEDY
GIRARD S. HAVILAND
BY
Stephen J. Rudy
ATTORNEY

United States Patent Office 3,322,890
Patented May 30, 1967

3,322,890
BUSHING-SEAL
John C. Kennedy, Orange, and Girard S. Haviland, West Hartford, Conn., assignors to The Jacobs Manufacturing Company, West Hartford, Conn., a corporation of New Jersey
Filed Mar. 31, 1966, Ser. No. 539,066
6 Claims. (Cl. 174—152)

This invention is concerned with a bushing-seal for an element required to extend through an opening formed in a wall of a fluid filled compartment.

The general objective of the bushing-seal is to seal against leakage from the compartment through the wall opening and around the element to the outside; also, to restrain the element against axial movement so as to materially reduce the possibility of its becoming disconnected from an associated device located within or without the compartment. Further, where the element is an electrical wire, another purpose of the bushing-seal is to provide a protective insulation between the wire and the metal wall of the compartment through which it extends.

In some applications of the device, as in the case of an engine, the compartment into which the element extends is enclosed by wall sections securely anchored fast to one another. The bushing-seal of the present invention is especially suitable for use in this application in that it is a one-piece structure adapted to be entered into a wall opening from the outside, and it does not require any accompanying nuts, washers or other components to be located within the compartment that might loosen and fall away. Another advantage of the structural nature of the bushing-seal of the present invention is that it does not require any undesirable slots in its body, nor any accompanying sleeves to effect a strong restraining grip upon the element passing through it.

While the invention is subject to various applications, it is especially suited for use in association with an engine, such as a diesel engine having an engine brake. This type of brake is mounted in a closed compartment at the top of the engine, and is provided with a solenoid actuator electrically connected to an external source of current by means of a wire passing through an opening in the engine wall. During operation of the engine, hot diesel engine oil causes an oil mist or spray to fill the compartment about the wire. This oil mist has high detergent and wetting characteristics; and difficulty has been experienced in preventing its leakage around the wire to the outside. The bushing-seal of the present invention not only provides a solution to this problem, but also serves to restrain the wire against undesirable axial movement relative to the device with which it is connected.

In another instance, the bushing-seal may be used for sealing a thread in a wall opening of the engine housing and holding and sealing a reinforced rubber tube which carries lubricating oil directly from a lubricating pump through the engine housing to the engine brakes.

In the accompanying drawings illustrating the invention:

Figure 1:
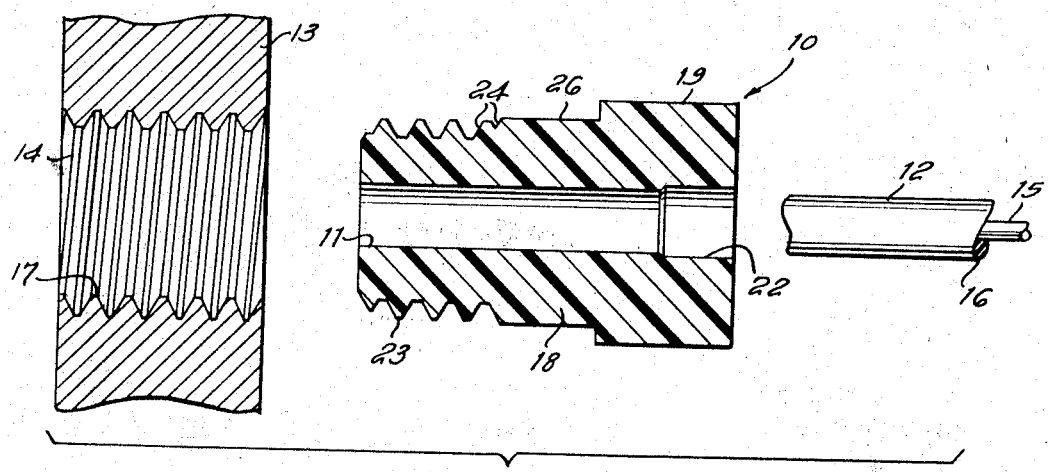
FIG. 1 shows in section in unassembled relation a bushing-seal, a wall, and an element to be sealed in the wall by means of the bushing-seal.
Figure 2:
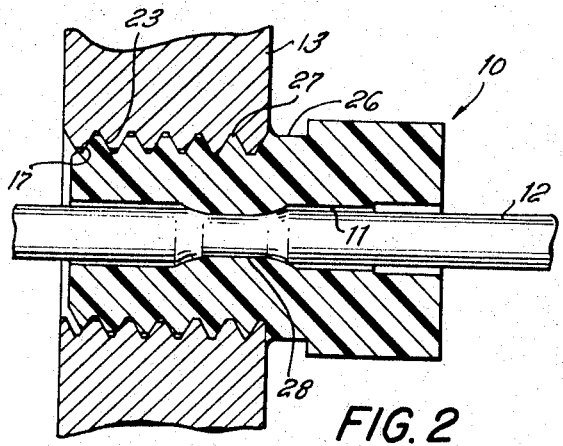
FIG. 2 shows the elements of FIG. 1 in assembled relation.
Figure 3:
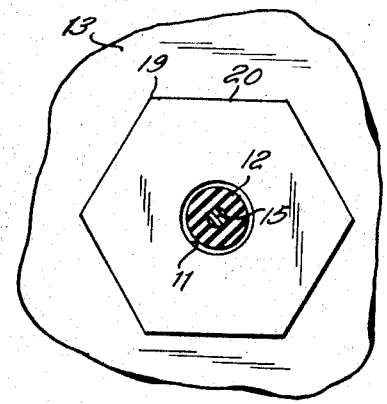
FIG. 3 is a right end view of FIG. 2.
Figure 7:
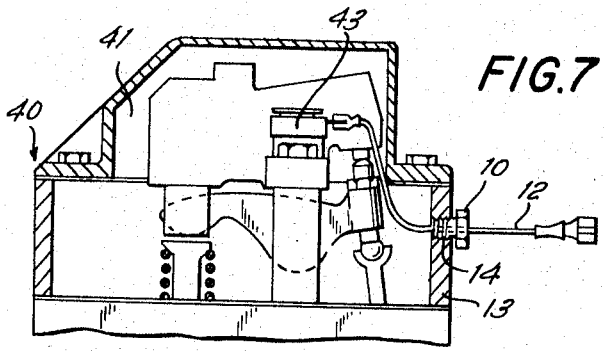
Figure 4:
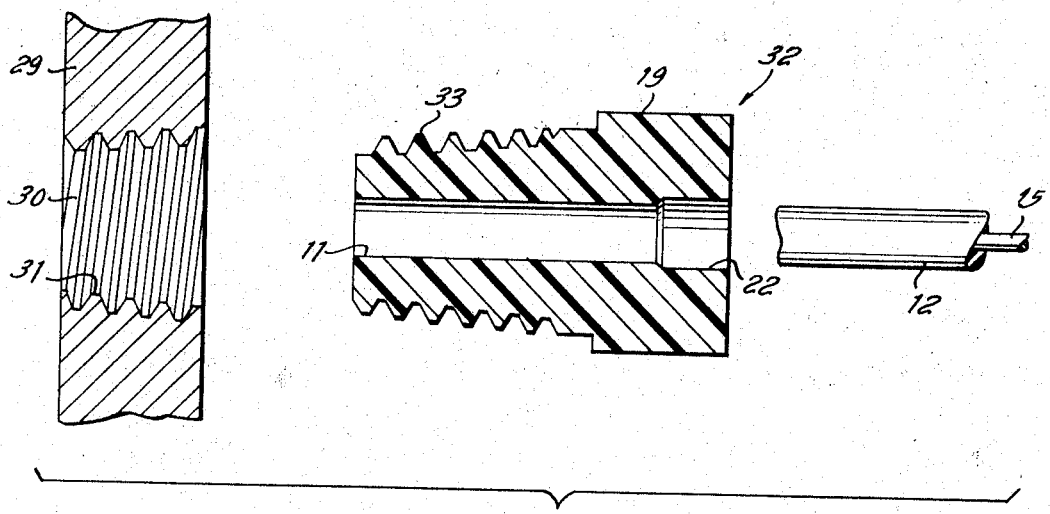
Figure 5:
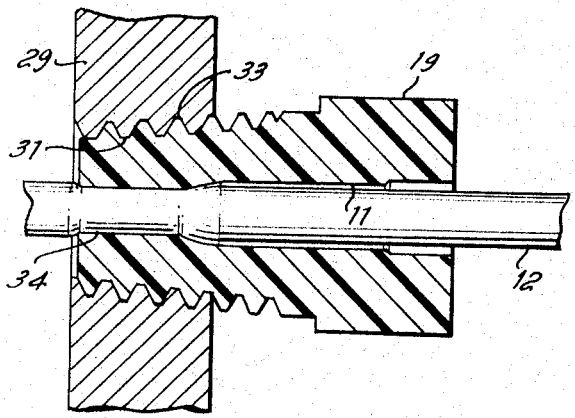
Figure 6:
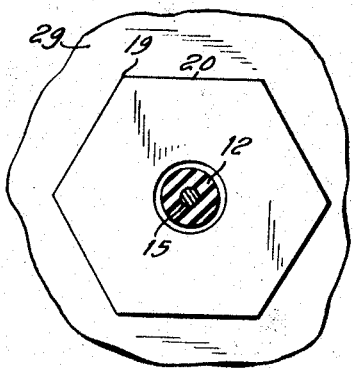

FIGS. 4–6 correspond respectively to FIGS. 1, 2 and 3, but illustrate a modified form of the invention; and FIG. 7 shows a typical application of the invention to an engine.

Reference is now directed to FIGURES 1–3 of the drawing wherein there is shown in FIG. 1, perparatory to assembly to one another, a bushing-seal 10 having an axial bore 11 in which an elongated cylindrical element 12 is slidably receivable; and a wall 13 having a threaded opening 14 into which the bushing-seal together with the element 12 extending from opposite ends thereof is intended to be screwed.

The element 12 is here shown as a conventional electrical wire having a core conductor 15 encased in a conventional soft sheath 16 of insulation material.

The opening 14 in the wall 13 is shown here as having a straight thread 17, complete from end to end. Here, the thread 17 is illustrated as a standard thread. The wall 13 is formed of metal material.

The bushing-seal has a cylindrical shank portion 18 terminating in a wrench-head 19, here of hexagonal form, having flats 20 permitting application of a wrench to tightly screw the bushing-seal into the opening 14. The axial bore 11 extends for the full length of the shank 18 and partway into the wrench head 19 where it connects with a counterbore 22. The counterbore serves as a guide that facilitates entry of the element 12 into the bore 11. The shank 18 has an external standard straight threaded portion 23, the last two or three threads 24 of which are incomplete and vanish or wash out into a cylindrical smooth surface section 26. The incomplete or vanishing threads 24 are the result of a conventional lead-in or chamfer in the threading die that was used to form the threaded area 23. The root diameter of the incomplete threads progressively increases from the start thereof until it vanishes into the cylindrical surface 26. The latter surface is of sufficient length to permit extension of the threaded area for several more threads, here for approximately four. The bushing-seal is formed from deformable or ductile material, such as aluminum or plastic, preferably nylon plastic. Nylon plastic or aluminum is desirable since either of these materials may be subjected to a possibility of about 10% deformation or strain without rupture. The bushing-seal illustrated here is formed of nylon plastic. Nylon plastic is preferable not only because of its deformation and resilient characteristics, but also because of its insulating nature. The wall 13 into which the bushing-seal is to be entered is, on the other hand, formed of relatively hard material which will cause progressive deformation of the bushing-seal in a general radial direction as entry of the bushing-seal into the wall opening is continued beyond the starting point of the incomplete threads and beyond the incomplete threads. This deformation will, as such entry is continued, progressively restrict the axial bore 11 until the element 12 is gripped fast therein and sealed fluid tight; this deformation will also progressively flow outwardly about the threads 17 of the wall opening to seal the latter fluid tight, as at 27 in FIG. 2.

In an example of using the bushing-seal, the wire 12 is first slidably inserted through the axial bore 11, and its ends are allowed to project from the bushing-seal to the extent desired. One end of the wire is then passed through the wall opening 14 for connection to an associated electrical device; and the threaded shank of the bushing-seal is caused to be screwed into the wall opening. The threaded portion of the bushing-seal, ahead of the incomplete threads 24, mates with and will normally screw readily into the threads 17 of the wall opening until the starting point of the incomplete threads is reached. Limited resistance to further entry will then be offered by the progressively increasing diameter of the root of the incomplete threads. The bushing-seal is then forcefully continued to enter the wall opening by application of sufficient torque to the wrench head by means of a wrench. As the incomplete threads are forcefully screwed into the wall opening, the soft nylon material of the bushing-seal yields and is displaced or deformed in a general radial direction both inwardly and outwardly. As entry of the bushing-seal is continued beyond the incomplete threads, inward deformation is further continued; the displaced material narrows the axial bore 11 until it presses about and squeezes the soft covering of the wire to effect a fluid tight seal of the wire in the bore and to anchor it fast against relative movement, as appears at 28 in FIG. 2. The material displaced outwardly flows about the threads 17 of the wall opening to fill the root area of several of the threads fluid tight, as appears at 27 at the right in FIG. 2.

During the operation of forcefully entering the bushing-seal, the operator may, from time to time, hand test the wire to determine its fastness in the axial bore 11. Entry of the bushing-seal may be continued until a hand test shows the wire to be adequately restrained. When the latter condition is obtained, a fluid tight condition of the bushing seal, relative to the wall opening 14 and to the wire 12, will also have been obtained. This desired condition occurs after entry of the shank of the bushing-seal has continued beyond the incomplete threads and for part of the distance of the cylindrical surface 26.

As earlier mentioned, the material forming the bushing-seal is resilient, deformable, and has a physical characteristic which permits deformation or deflection of about 10% without rupture. This nature of the bushing-seal is of desirable advantage, it provides a safety factor against shearing or undesirable destruction of the bushing-seal while it is being forcefully driven into the wall opening. The size of the hex head 19 is preferably a little greater in cross-section than the outer diameter of the threads of the shank. When an open wrench is applied to the head to drive the bushing-seal into the wall opening, a sealing effect on both the outer and inner diameters of the bushing-seal relative to the wall and to the element passing through the bushing-seal will be obtained without shearing the bushing-seal and before any damage occurs to the head. But, if the bushing-seal is forcefully driven by the wrench longer than necessary to obtain the desired sealing and restraining effect, the torque applied to the head will be such that the corners of the head will dub over or yield and will cause the wrench to slip around the head without further driving effect. This dubbing over of the corners will be only about 50% permanent, due to the resilient characteristic of the nylon material. The dubbing over of the corners and consequent slipping of the wrench will, however, avoid shearing of the bushing-seal.

A practical visual guide has also be provided in the structural form of the bushing-seal to indicate to the operator when the objective of the invention has been effected. It has been found that when the bushing-seal has been entered into the wall opening beyond the incomplete threads for a distance over the cylindrical smooth surface 26 corresponding to approximately two threads, a fluid tight seal of the bushing-seal relative to the wire 12 and the wall opening 13, as well as a fixed condition of the wire, will be effected. Accordingly, the cylindrical surface 26 has been given a linear dimension corresponding to a predetermined ratio to the pitch of the threads of the shank. Here, the length of the surface 26 corresponds to a distance of approximately four additional threads. Accordingly, the operator will known here that forceful entry of the bushing-seal into the wall opening may be discontinued when entry has been continued beyond the incomplete threads to about the mid-point of the cylindrical surface 26. As the surface 26 is forcefully screwed into the wall opening, additional threads are formed as the material of the surface 26 yields and is deformed by the relatively harder threads 17 of the wall opening. It is to be noted from FIG. 2 that the displaced material 28 of the bushing-seal restricting the axial bore 11 is largely in the area of the threads which have been forcefully entered into the wall opening.

In FIGS. 4–6, a further illustration of the invention is shown. Here, an opening 30 in the hard metal wall 29 has a tapered thread, such as a standard pipe thread 31, and the deformable bushing-seal 32 is provided with a corresponding tapered standard pipe thread 33. Entry of this tapered form of the bushing-seal into the wall opening is relatively free until the threads 33 of the bushing-seal meet size to size with the threads 31 of the wall opening. When the threads meet size to size, the threads on the bushing-seal are resisted against further entry as they encounter threads of smaller diameter or size in the wall opening. If a forceful torque is then applied to the head 19 to overcome this resistance to further enter the bushing-seal into the wall opening, a forced wedging action occurs between the threads of the bushing-seal and those of the wall opening. This causes deformation of the bushing-seal in a general radial direction. In this action, the deformed or displaced material flows about the threads of the wall opening to seal the latter fluid-tight; it also flows inwardly to restrict the axial bore 11, as appears at 34. Restriction of the bore causes the element 12 to be sealed fluid-tight and restrained therein against relative axial movement. Because of the tapers of the wall opening and of the bushing-seal, the resistance and consequent wedging action is experienced along the length of the shank portion entered into the opening. Consequently, deformation occurs along the region of the entire threaded area of the shank entered into the wall opening, as appears in FIG. 5.

FIG. 7 shows a typical application of the invention to an engine 40. While either of the straight or the taper threaded forms may be used, the straight threaded form of FIG. 1 is here illustrated as applied to the engine. The engine is of a diesel type having an upper closed compartment 41 in which an engine brake operable by means of a solenoid 43 is arranged. An electrical wire 12, connected to the solenoid, extends through an opening 14 in a wall 13 of the compartment to an enternal source of current. During operation of the engine, hot diesel engine oil causes an oil mist to fill the closed compartment at the top of the engine about the wire. This oil mist, which is characterized by its high detergent and wetting characteristics, is sealed by the bushing-seal 10 from leaking to the outside through the wall opening 14, and is further sealed by the bushing-seal from leaking to the outside around the wire 12. Further, the bushing-seal restrains the wire against relative axial movement, whereby the wire is prevented from working itself loose from its connection with the solenoid as the operating engine vibrates. Further, the nylon material of which the bushing-seal is formed provides a desirable electrical insulation between the wire and the metal wall 13 of the engine.

While the invention has been illustrated in association with an electrical wire, it is subject to other applications; for example, it may be used as a seal and restrainer for a tube.

What is claimed is:

1. In sealing means for effecting a fluid-tight seal between a wall and an element passable through an opening in the wall and simultaneously restraining the element against relative axial movement, wherein the wall defining the opening is threaded throughout and formed of hard material; a bushing-seal having a axial bore of uniform section in which the element is slidably receivable including a shank terminating at one end in a wrench head, there being a smooth cylindrical surface adjacent the wrench head and an externally threaded area extending from the cylindrical surface to the opposite end of the shank, the smooth cylindrical surface extending for a linear distance allowing extension of the threaded area for a specific number of additional threads, the threaded area comprising a main section of straight threads normally mateable without resistance with the threads of the wall opening and further comprising a terminal section of incomplete threads vanishing into the cylindrical surface offering limited resistance to engagement with the threads of the wall opening, the bushing-seal being formed of deformable material relatively softer than the material of the wall opening, and the shank having a characteristic upon being forcefully screwed into the wall opening over the area of the incomplete threads and beyond the incomplete threads for a predetermined distance less than the whole of said cylindrical surface to deform radially inwardly and outwardly to fill areas about the threads of the wall opening fluid-tight, to contract to a predetermined degree the axial bore fluid-tight about the element and to grip the element fast in restraint of relative axial movement thereof.

2. In sealing means as in claim 1, wherein the length of the cylindrical surface has a predetermined ratio to the pitch of the threads of the threaded area.

3. In sealing means as in claim 1, wherein the material forming the bushing seal has a deformation characteristic of approximately 10% without rupture, the wrench head is defined by a plurality of flats and corners separating the flats permitting application of an open wrench thereto, and the corners of the wrench head being deformable so as to cause relative slippage of the wrench upon application through the wrench to the wrench head of a predetermined torque not exceeding that required to obtain the maximum of said deformation characteristic.

4. A bushing-seal having an axial bore for slidable reception of an element, comprising a shank terminating at one end in a wrench head, the shank having a smooth cylindrical surface adjacent the head and an externally threaded area extending from the cylindrical surface to the opposite end of the shank, said axial bore being of uniform diameter and extending from the opening of the seal at the threaded end for a distance at least equal to the length of the externally threaded area, the smooth cylindrical surface extending for a linear distance allowing selective extension of the threaded area for a plurality of additional threads, the threaded area comprising a main section of complete threads and a terminal section of incomplete threads vanishing into the cylindrical surface, the bushing-seal being formed of deformable material adapted to deform radially inward to contract the axial bore upon forcefully screwing the shank over the area of the incomplete threads into a threaded opening of a relatively harder material, and the cylindrical surface being adapted to deform radially inward to further contract the axial bore upon forcefully screwing the shank into the said threaded opening beyond the incomplete threads; characterized in that the linear distance of the smooth cylindrical surface corresponds to the pitch of a predetermined number of threads and that when a visually determinable portion of the cylindrical surface less than the whole thereof has been forcefully screwed into the threaded opening the axial bore will have contracted to a selected predetermined degree.

5. A bushing seal having an axial bore for slidable reception therein of an element, comprising a tapering shank terminating at its major diameter end in a wrench head, the shank having an externally threaded surface extending substantially from the wrench head to the opposite end, said axial bore being of uniform diameter and extending from the opening of the seal at the threaded end for a distance at least equal to the length of the externally threaded surface, the bushing seal being formed of deformable material adapted to deform radially inward to contract the bore should the shank be forcefully screwed into a smaller size tapering threaded opening, and the bushing seal having a deformation characteristic of a certain degree without rupture; characterized in that the wrench head is defined by a plurality of flats and corners separating the flats permitting application of an open wrench thereto, and the corners of the wrench head being deformable so as to deform and allow relative slippage of the wrench upon application through the wrench to the wrench head of a predetermined torque not exceeding that required to obtain the maximum deformation characteristic but sufficient to cause contraction of the axial bore to a predetermined degree should the shank be forcefully screwed for a predetermined extent into a smaller sized tapering threaded opening.

6. A coupling seal unit comprising a wall of a fluid containing compartment through which wall a tapering threaded opening extends, an elongated element having a deformable casing and extending through said opening, and deformable bushing means surrounding the element adapted when forcefully entered into said opening to seal the opening fluid-tight and to restrain the element against axial movement relative to the opening; the bushing means comprising a tapering threaded shank terminating at its major diameter end in a wrench head, an axial bore of uniform diameter extending through the bushing means in which the element is slidably received and projects from the ends thereof, said axial bore having a length at least equal to the length of the tapering threaded shank, the taper of the threaded shank being such as to allow an initial free threaded engagement with the threads of the opening and thereafter to offer resistance to further threaded engagement with the threads of the opening, the bushing being formed of material relatively softer than that defining the opening in the wall so that upon application of a torque force to the bushing means sufficient to overcome such resistance a radial wedging action is obtainable of the shank relative to the wall of the opening so as to deform the shank in a general radial direction to cause flow of material about the threads of the opening to seal the latter and to cause inward flow of material to restrict the axial bore to a diameter less than that of the outer diameter of the element for substantially the full length of the threaded engagement of the shank with the opening, and the deformable casing of the element adapted under the pressure of such restricting action to accordingly contract.

References Cited
UNITED STATES PATENTS

| | | | |
|---|---|---|---|
| 1,770,504 | 7/1930 | Wyman | 174—152 |
| 2,530,258 | 11/1950 | Marsan | 174—153 |
| 2,755,110 | 7/1956 | Jacobs | 285—356 X |
| 3,233,920 | 2/1966 | Ammann | 285—54 |

FOREIGN PATENTS

| | | |
|---|---|---|
| 1,282,648 | 12/1961 | France. |

LARAMIE E. ASKIN, *Primary Examiner.*